United States Patent [19]

Rupp et al.

[11] Patent Number: 4,467,142
[45] Date of Patent: Aug. 21, 1984

[54] SYSTEM FOR TRANSMITTING EMERGENCY CALLS FROM PERSONS REQUIRING ASSISTANCE

[75] Inventors: Dieter Rupp, Allmersbach; Wolfgang Weeber, Aspach; Paul Lissner, Backnang; Josef Steimle, Allmersbach, all of Fed. Rep. of Germany

[73] Assignee: Licentia Patent-Verwaltungs-GmbH, Frankfurt am Main, Fed. Rep. of Germany

[21] Appl. No.: 417,369

[22] Filed: Sep. 13, 1982

[30] Foreign Application Priority Data

Sep. 18, 1981 [DE] Fed. Rep. of Germany ....... 3137147

[51] Int. Cl.$^3$ ............................................ H04M 11/04
[52] U.S. Cl. ..................................... 179/5 R; 179/2 A
[58] Field of Search ......................... 179/2 A, 5 R, 5 P

[56] References Cited

U.S. PATENT DOCUMENTS

| | | | |
|---|---|---|---|
| 3,213,200 | 10/1965 | Vogelman | 179/3 |
| 3,906,491 | 9/1975 | Gosswiller et al. | |
| 4,009,342 | 2/1977 | Fahrenschon et al. | 179/2 DP |
| 4,064,368 | 12/1977 | Dibner | 179/5 R |
| 4,338,493 | 7/1982 | Stenhuis et al. | 179/5 R |
| 4,392,125 | 7/1983 | Iwata | 179/5 R X |

FOREIGN PATENT DOCUMENTS

| | | | |
|---|---|---|---|
| 1045732 | 1/1979 | Canada | 179/5 R |
| 214251 | 1/1981 | European Pat. Off. | |
| 910794 | 5/1954 | Fed. Rep. of Germany | |
| 2153529 | 6/1973 | Fed. Rep. of Germany | |
| 2903459 | 8/1979 | Fed. Rep. of Germany | 179/5 R |
| 2319258 | 2/1977 | France | |
| 57-91067 | 6/1982 | Japan | |
| 7709333 | 2/1979 | Netherlands | |

OTHER PUBLICATIONS

"Hutte IV B Fernmeldetechnick"[Communication Art], 28th Edition, Berlin and Munich, 1962, p. 730.

Primary Examiner—A. D. Pellinen
Assistant Examiner—Keith E. George
Attorney, Agent, or Firm—Spencer & Frank

[57] ABSTRACT

A system for transmitting an emergency call from a person requiring assistance. The system includes an emergency calling device coupled via a telephone exchange system to an emergency call receiving center having an operator. The calling device automatically dials a predetermined emergency telephone number upon actuation of a sensor by the person requiring assistance for placing a call to the emergency center. A first data device is provided for transmitting predetermined emergency data by frequency keying in the voice band to the emergency center. An intercommunication set in the calling device establishes a voice connection between the person requiring assistance and the emergency center operator. The intercommunication set is switchable between states of voice transmission and voice reception. A first control unit in the calling device is responsive to a first operating mode control signal for switching in the first data device and switching out the intercommunication set, and is responsive to a second operating mode control signal for switching in the intercommunication set and switching out the first data device. In the emergency center a control unit controls the transmission of a control tone to the calling device. The control tone constitutes the first operating mode control signal and the lack of the control tone constituting the second operating mode control signal. A second data device in the emergency center selectively transmits voice direction control signals by frequency keying in the voice band for controlling the state of the intercommunication set in the calling device.

3 Claims, 10 Drawing Figures

| STEP | |
|---|---|
| Z1 | RECEIVING RINGING SIGNAL FROM LINE COMPONENT GROUP |
| Z2 | STORING RINGING SIGNAL |
| Z3 | LINE COMPONENT GROUP: CLOSE SUBSCRIBER LOOP |
| Z4 | SET SWITCH u4 IN OPERATION POSITION |
| Z5 | STS: TRANSMIT CONTROL TONE |
| Z6 | RECEIVING D.C. SIGNALS FROM DT |
| Z7 | DISPLAY AND OPERATING FIELD: ENABLE DISPLAY ACCORDING TO D.C. SIGNALS RECEIVED FROM DT |
| Z8 | RECEIVING VOICE DIRECTION CONTROL SIGNAL FROM DISPLAY AND OPERATING FIELD |
| Z9 | DZ: ENABLE TRANSMISSION OF PULSE SEQUENCE ACCORDING TO VOICE DIRECTION CONTROL SIGNAL |
| Z10 | STS: SWITCHING OFF CONTROL TONE |

FROM STEP Z4 (FIG.7)

STEP Z5': STS: TRANSMIT CONTROL TONE PULSE (STEP Z6....Z9 OF FIG.7)

Z10': DZ: ENABLE TRANSMISSION OF PULSE SEQUENCE ACCORDING TO SECOND OPERATE MODE CONTROL SIGNAL (STEP Z11....Z13 OF FIG.8)

Z14': STS: TRANSMIT CONTROL TONE PULSE

TO BE CONTINUED BY STEP Z15 (FIG.8)

FIG. 10

FROM STEP Z4 (FIG.7)

STEP Z5": S1 AND S2: TRANSMIT CONTROL TONE PULSES (STEP Z6....Z9 OF FIG.7)

Z10": S1 AND S3: TRANSMIT CONTROL TONE PULSES (STEP Z11...Z13 OF FIG.8)

Z14": S1 AND S2: TRANSMIT CONTROL TONE PULSES

TO BE CONTINUED BY STEP Z15 (FIG.8)

SYSTEM FOR TRANSMITTING EMERGENCY CALLS FROM PERSONS REQUIRING ASSISTANCE

BACKGROUND OF THE INVENTION

The present invention relates to a system for transmitting emergency calls from persons requiring assistance.

Such a system is disclosed in European patent application No. 21,425, filed June 25, 1980, wherein an emergency calling station connected to a subscriber line of a dial telephone exchange system automatically calls the number of an emergency center, likewise connected to the dial telephone exchange system, upon actuation of a sensor by the person requiring assistance. Bidirectional data transmission, by way of frequency keying, takes place in the voice band over the thus established connection. A two-way voice communication device in the emergency calling station can be switched into operation by an operating mode control signal from the emergency center. The direction of voice transmission is then switched by a voice transmission direction control signal.

The above described system has the drawback that data and voice transmission interfere with one another because the signals of both transmission modes are transmitted, via a summing amplifier and a branching circuit, over the same telephone connection.

The simultaneous transmission of voice and data over a single channel without mutual interference is known as the so-called carrier telegraphy and is described, for example, in the book "Hutte IV B, Fernmeldetechnik" [Communication Art], 28th Edition, Berlin and Munich, 1962, page 730. Its drawback is that because of the subdivision of the entire band into a voice channel and a telegraph channel by means of frequency filters, the clarity of the voice transmission and the data transmission rate are less than if each had available the full bandwidth.

The alternating transmission of voice and data over the same telephone connection by switching off the speaking device with an operating mode control signal transmitted over the telephone connection and switching on the data device is known, generally, from German Pat. No. 910,794. This known arrangement, however, has the disadvantage that the switching between data transmission and voice transmission is relatively slow.

SUMMARY OF THE INVENTION

It is an object of the present invention to provide a system for transmitting emergency calls from persons requiring assistance of the above-mentioned type wherein a clear voice transmission as well as high transmission reliability and high speed for the data transmission are assured.

It is a further object of the invention to provide a system for transmitting emergency calls from persons requiring assistance of the above-mentioned type wherein unrestricted and economical switching is permitted between data transmission and voice transmission.

The above and other objects are accomplished in accordance with the invention wherein a system is provided for transmitting an emergency call from a person requiring assistance, the system including an emergency calling device coupled via at least one subscriber line of a telephone exchange system to an emergency call receiving center having an operator. The emergency calling device includes an automatic dialing means coupled to one such subscriber line and having an actuating sensor. The automatic dialing means automatically dials a predetermined emergency telephone number upon actuation of the sensor by the person requiring assistance for placing a call to the emergency call receiving center. A first data means is selectively connectable to the subscriber line for transmitting predetermined emergency data by frequency keying in the voice band via the telephone exchange system to the emergency call receiving center. An intercommunication means selectively connectable to the subscriber line is also provided in the emergency calling device for establishing a voice connection via the telephone exchange system between the person requiring assistance and the operator in the emergency call receiving center. The intercommunication means includes a first controllable switching means for switching between states of voice transmission and voice reception. A first control means in the emergency calling device is responsive to a first operating mode control signal transmitted via the telephone exchange system for connecting the first data means to the subscriber line and switching out the intercommunication means, and is responsive to a second operating mode control signal transmitted via the telephone exchange system for connecting the intercommunication means to the subscriber line and switching out the first data means. The emergency call receiving center includes means coupled to the telephone exchange system for receiving the call from the emergency calling device and establishing a connection via the telephone exchange system between the emergency calling device and the emergency call receiving center, a means for producing a control tone selectively connectable to the telephone exchange system and a second control means for controlling the transmission of the control tone via the telephone exchange system to said emergency calling device. The control tone constitutes the first operating mode control signal and the lack of the control tone constitutes the second operating mode control signal. A second data means selectively connectable to the telephone exchange system is provided in the emergency call receiving center for selectively transmitting voice direction control signals by frequency keying in the voice band via the telephone exchange system to the emergency calling device for controlling the state of the switching means in the intercommunication means of the emergency calling device.

It is an advantage of the present invention that, due to the configuration of the operating mode control signals, the switching between data and voice transmission is very fast.

A further advantage is that a data end device in the emergency calling device can have a transmission rate such that a plurality of reports and instructions can be transmitted in both directions in a short time. For example, after actuation of the sensor, the emergency calling device may transmit to the emergency call receiving center data regarding the type of emergency, in addition to an identification signal.

In the opposite direction, control signals, in addition to the voice direction control signals, can be transmitted by the emergency call receiving center so that the operator in the emergency center can control all functions within and outside the emergency calling device as required to take care of the emergency. It is thus possible to place the emergency call even if the person requiring assistance is unable to perform any further operations on the set after actuating the sensor.

DESCRIPTION OF THE PREFERRED EMBODIMENTS

Figure 1:
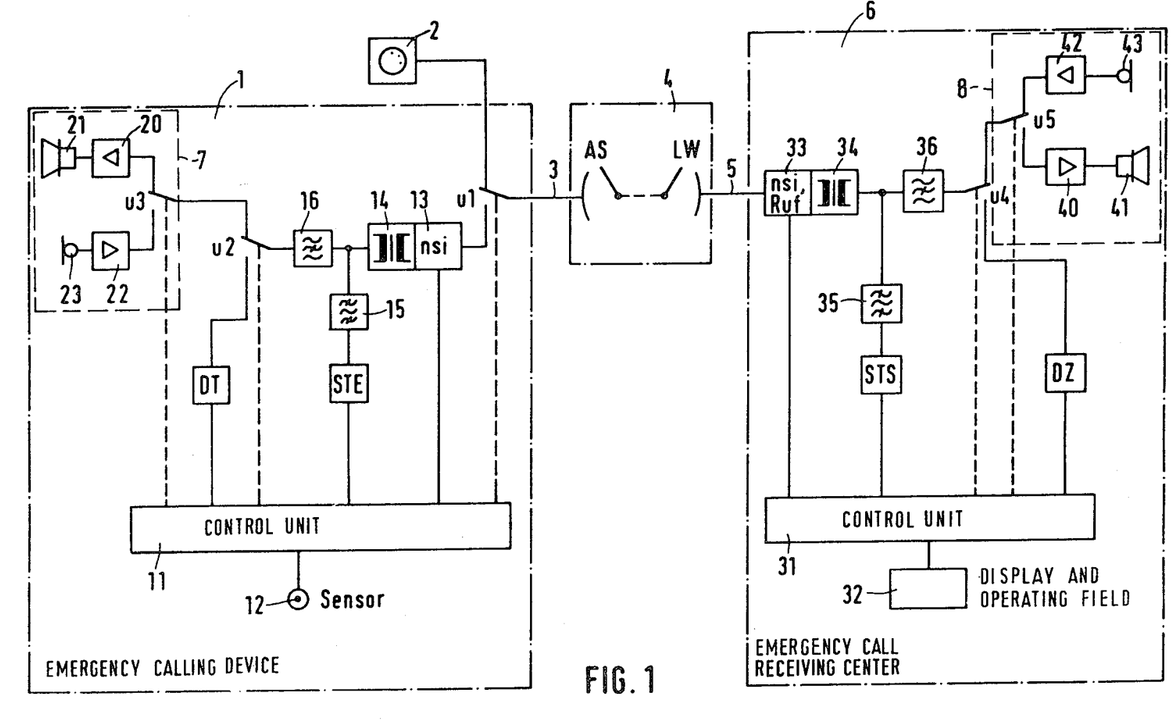
FIG. 1 is a block circuit diagram of one embodiment of the invention.

FIG. 1 shows an emergency calling device 1 and a standard telephone set 2 alternately connected by a switch u1 to a dial telephone exchange system 4 via a subscriber line 3. An emergency call receiving center 6 (hereinafter referred to as "emergency center") is connected to dial telephone exchange system 4 via a further subscriber line 5. Of course, in an actual system, emergency center 6 may be accessed by any one of a plurality of emergency calling devices 1. Of the selectors in the dial telephone system only a line finder AS and a line selector LW are indicated.

Emergency calling device 1 includes a control unit 11 to which is connected an actuating sensor 12. An intercommunication device 7 comprising a loudspeaker amplifier 20, a loudspeaker 21, a microphone amplifier 22, a microphone 23 and a switch u3 is provided for voice communication with emergency center 6. Switch u3 is actuated by control unit 11 in response to voice direction control signals emitted by emergency center 6. Intercommunication device 7 is coupled to subscriber line 3 via a switch u2, a band rejection filter 16, a transformer 14, a line component group 13 and switch u1.

A data end device DT is connected to control unit 11 and is selectively coupled to subscriber line 3 via switch u2, which is actuatable by control unit 11. Data end device DT stores different information, such as identification data, reports and instructions, control signals, etc., and transmits such data to emergency center 6 when switch u2 is in the proper position and when data device DT receives the proper actuating signal from control unit 11.

A control tone receiver STE, also connected between subscriber line 3 and control unit 11, functions to receive an operating mode control signal in the form of a control tone transmitted over subscriber line 3 by emergency center 6.

Control tone receiver STE converts the control tone into a d.c. signal that is fed to control unit 11 which produces the variously required actuating signals as explained below.

A bandpass filter 15, precedes control tone receiver STE for passing thereto only the frequency of the control tone. Band rejection filter 16, on the other hand blocks the frequency of the control tone. The control tone preferably has a frequency of 324 Hz.

Line component group 13 is controlled by control unit 11 and functions to close or open the subscriber loop and to send dial pulses over subscriber line 3 in a manner well known in the art. Transformer 14 provides d.c. isolation between subscriber line 3 and the bandpass filter 15 as well as band rejection filter 16.

Emergency center 6 includes a control unit 31 which is connected to a display and operating field 32 that serves as the interface for a human operator. A line component group 33 is connected to subscriber line 5 and includes a ringing current receiver for recognizing the ringing current transmitted by line selector LW and emitting a corresponding signal to control unit 31. Line component group 33 additionally includes a switching means for closing or opening the subscriber loop and transmitting dial pulses, these functions also being controllable by control unit 31. Line component group 33 also functions in a manner well known in the art.

As in the emergency calling device a transformer 34 is provided for providing d.c. isolation between subscriber line 5 and the other components in emergency center 6.

A data end device DZ, connected to control unit 31, is selectively coupled by a switch u4 to subscriber line 5 via a band rejection filter 36, transformer 34 and line component group 33.

Like data end device DT, data end device DZ stores information and control signals which when switch u4 is in the proper position and data end device DZ is actuated by a signal from control unit 31, are transmitted via subscriber line 5 to emergency calling device 1.

A control tone transmitter STS, which is actuated by control unit 31, emits a tone frequency in the voice range, preferably 324 Hz, which when transmitted to emergency calling device 1 performs a control function as described more fully below.

A band pass filter 35 precedes control tone transmitter STS for passing the frequency of the control tone and band rejection filter 36 is connected for blocking the frequency of the control tone.

An intercommunication device 8 comprising a loudspeaker amplifier 40, a loudspeaker 41, a microphone amplifier 42, a microphone 43 and a switch u5 actuatable by control unit 31 for reversing the direction of voice transmission, is provided in emergency center in a like manner to intercommunication device 7 in emergency calling device 1.

Switch u4 is actuatable by control unit 31 for switching out intercommunication device 8 and switching in data end device DZ.

Switches u1 to u5 for the purposes of this description are relay contacts and are illustrated in their rest position. They are actuated by control unit 11 or 31 which emit excitation currents to associated windings. Other types of electronically controllable switches could obviously be used in lieu of relays.

Data end devices DT and DZ are part of a remote action system which is able to transmit information and control signals in either direction between emergency calling device 1 and emergency center 6. The transmissions are conducted by telegraphing different pulse sequences by way of frequency keying between 1300 Hz and 2100 Hz in the voice band. The information to be transmitted in each individual case is determined by correspondingly by actuating d.c. inputs to data end device DT or DZ from control unit 11 or 31, respectively. The system end receiving the information transmits it to control unit 11 or 31 from d.c. outputs of data end device DT or DZ, respectively. Remote action systems including data end devices such as DT and DZ are well known and are commercially available. Preferably the remote action system "GEADAT 81GT" from AEG-TELEFUNKEN is used.

As display and operating field 32 is preferably used a device called "Bildschirmcomputer TELECOMP 5200" from AEG-TELEFUNKEN.

Figure 5:
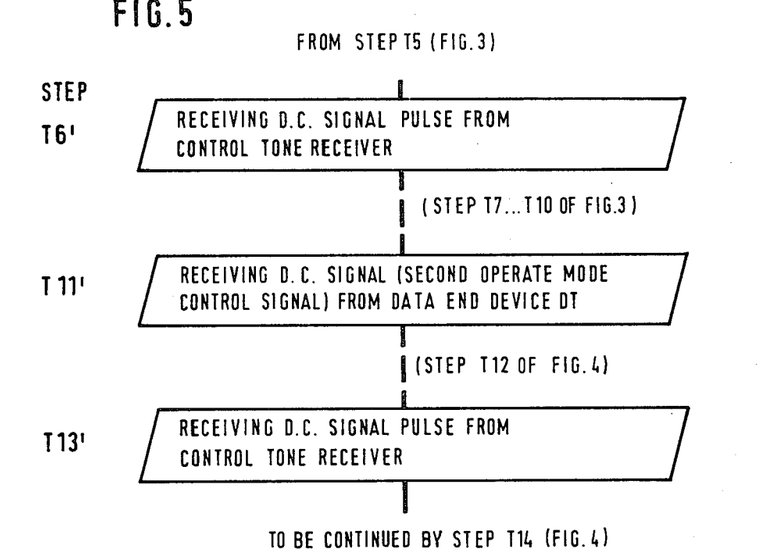
Figure 6:
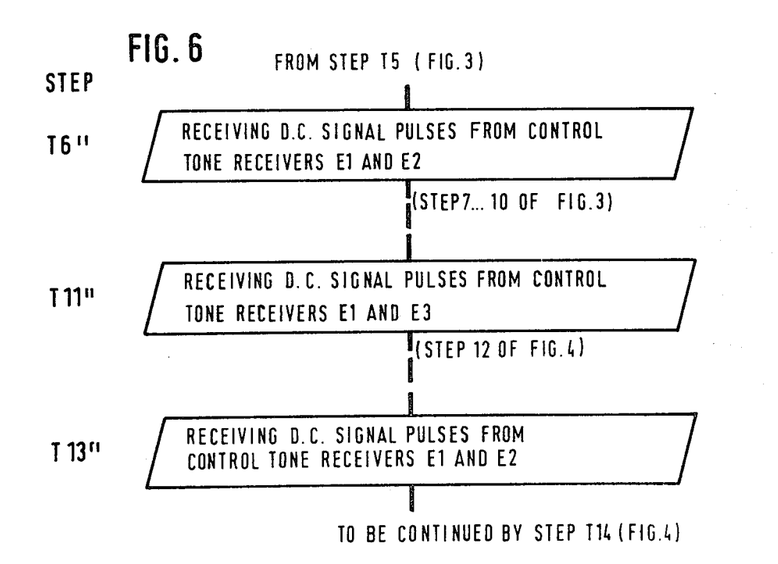
Figure 7:
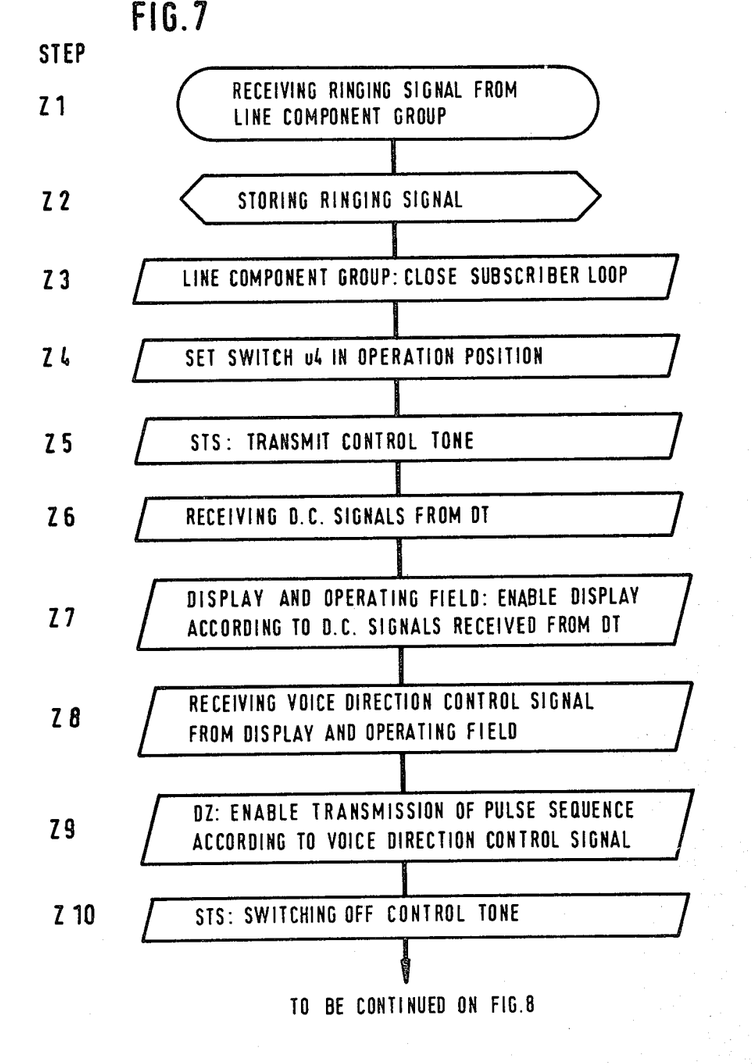
Figure 8:
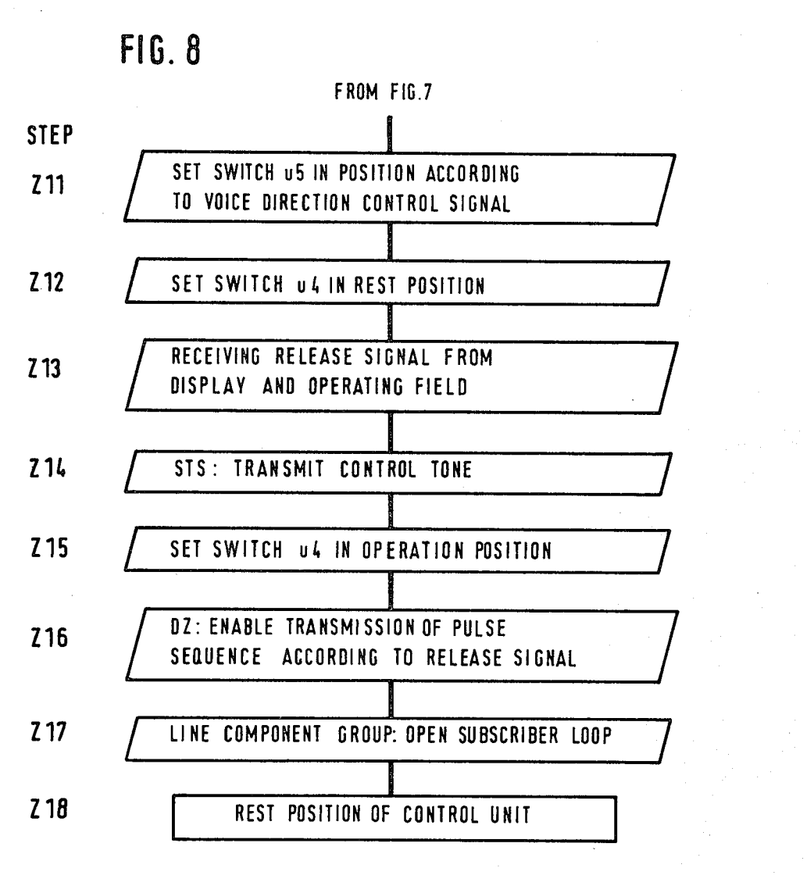
Figure 9:
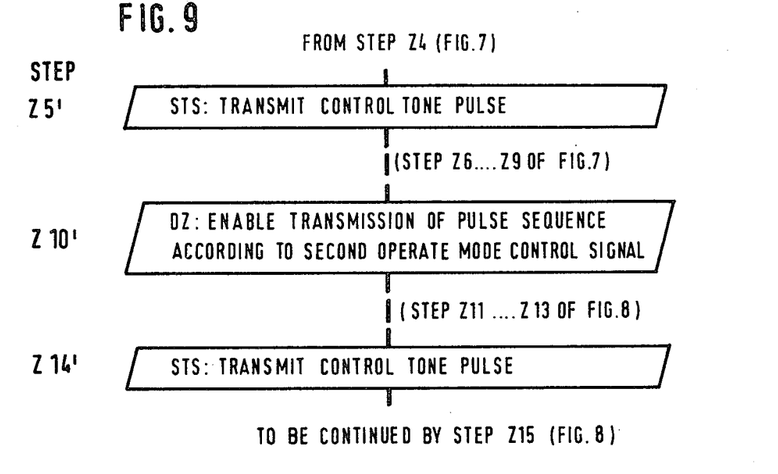
Figure 10:
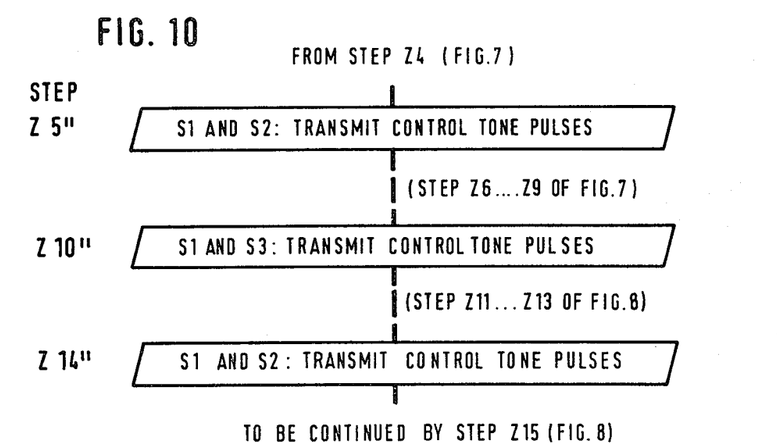

As control units are employed microcomputers of the type 1802 from the Radio Corporation of America (RCA). Their operating program is shown in the FIGS. 3 to 10, whereat FIGS. 3 to 6 concern the control unit in the emergency calling device and FIGS. 7 to 10 concern the control unit in the emergency call receiving center. FIGS. 3, 4, 7 and 8 relate to the system shown in FIG. 1 whose operation is described below. FIGS. 5 and 9 show the modification of the function of the operating mode control signals also described in relation to FIG. 1. FIGS. 6 and 10 show the modifications which must be made to FIGS. 3, 4, 7, 8, respectively so they will include the steps in the operating program for the control units 11' and 31' in the system according to FIG. 2.

The operation of the system in FIG. 1 will now be described.

In the rest state of switch u1 of emergency calling device 1, telephone set 2 is connected via subscriber line 3 with dial telephone exchange system 4 so that conversation can take place from this telephone set the same as from any other telephone set connected to the telephone exchange system 4.

In the case of an emergency, the person requiring assistance actuates sensor 12. Control unit 11 then switches switch u1 so that subscriber line 3 is disconnected from telephone set 2 and connected to line component group 13. Control unit 11 next causes line component group 13 to close the subscriber loop. This causes a line finder and a group selector to be seized in dial telephone exchange system 4. Thereupon line component group 13 dials the number of emergency center 6. The ringing current thus transmitted by line selector LW of dial telephone exchange system 4 travels through subscriber line 5 to line component group 33 which, after recognizing the ringing current, transmits a corresponding signal to control unit 31. This signal causes line component group 33 to close the subscriber loop, thus switching off the ringing current in line selector LW and switching through the connection between emergency calling device 1 and emergency center 6. Control unit 31 puts switch u4 in its operating position, rendering intercommunication device 8 ineffective and switching in data end device DZ. Additionally, control unit 31 enables control tone transmitter STS which emits a control tone at a frequency of 324 Hz, which tone travels through bandpass filter 35, transformer 34, line component group 33, subscriber line 5, dial telephone exchange system 4, subscriber line 3, switch u1, line component group 13, transformer 14, and bandpass filter 15 to control tone receiver STE.

Control tone receiver STE then emits a d.c. signal to control unit 11 which puts switch u2 into its operating position and thus switches off intercommunication device 7 and switches in data end device DT. Moreover, control unit 11 causes data end device DT to transmit the identification of emergency calling device 1. If a plurality of actuating sensors 12 are provided, an identification for the respective sensor is also transmitted. The transmission of further information, for example medical data regarding the person requiring assistance, may be provided. The identification and possibly further information are transmitted by data end device DT through switch u2, band rejection filter 16, transformer 14, line component group 13, switch u1, subscriber line 3, dial telephone exchange system 4, subscriber line 5, line component group 33, transformer 34, band rejection filter 36 and switch u4 to data end device DZ where they are converted into d.c. signals and fed to control unit 31 for display on display and operating field 32. In the reverse direction, information such as an acknowledgement, can also be transmitted by data end device DZ.

Interference in the data transmission from the simultaneously transmitted control tone is impossible, because band rejection filters 16 and 36 prevent the tone frequency from reaching the inputs of data end devices DT and DZ. Band rejection filters 16 and 36 limit the originally available voice channel having a bandwidth from 300 Hz to 3400 Hz to a bandwidth from 400 Hz to 3400 Hz so that a relatively fast data transmission at a telegraphing speed of 1200 baud is still possible.

If the operator wishes to talk to the person requiring assistance, a corresponding key is actuated in display and operating field 32 whereupon data end device DZ is caused by control unit 31 to transmit a voice direction control signal corresponding to the desired voice direction to data end device DT. Data end device DT responds to the voice direction signal by issuing a d.c. signal to control unit 11 which correspondingly actuates switch u3. In emergency center 6 control unit 31 actuates switch u5 corresponding to the desired voice direction, returns switch u4 to the rest position after the transmission of the voice direction control signal and switches off control tone transmitter STS. This returns switch u2 in emergency calling device 1 to its rest position so that intercommunication device 7 is again effective and the voice connection is reestablished.

In this operating mode, band rejection filters 16 and 36 prevent response of control tone receiver STE to frequencies of 324 Hz which may possibly be contained in the voice transmission. By the above-mentioned restriction of the bandwidth of the voice band by means of band rejection filters 16 and 36 by only 100 Hz on the lower end, leaving a voice band of 400 Hz to 3400 Hz, the clarity of the voice transmission is insignificantly reduced.

If the voice direction is to be reversed, a corresponding key is actuated by the operator in display and operating field 32 which switches switch u4 into its operating position, switches on control tone transmitter STS which puts switch u2 into its operating position. Thus, data end devices DT and DZ are switched in again so that the voice direction control signal corresponding to the new voice direction can be transmitted to place switch u3 into its corresponding position. Switch u5 is actuated directly by control unit 31 to the corresponding position. After switching of switch u4 back to its rest position and disconnection of the control tone the voice connection is reestablished.

The above-described reversal of the voice direction can be effected as often as desired. It is also possible to switch to data transmission during a conversation by transmitting the control tone so that, in the manner described above, any other data, instructions, reports or control signals may be transmitted. Due to the high telegraph speed, the voice transmission is then interrupted for only a maximum of 200 ms, which is not considered annoying.

When the operator is sufficiently informed about the emergency, he depresses an actuation key in display and operating field 32 which switches back in control tone transmitter STS and switches switch u4 into its operating position to effect a change from voice to data transmission. Then the emergency center transmits an actuation instruction to emergency calling device 1 to cause, via control unit 11, line component group 13 to open the subscriber loop. Control unit 31 causes line component group 33 to open its subscriber loop as well. This releases the telephone connection.

The functions of the operating mode control signals described above in connection with FIG. 1 may be altered without departing from the basic structual arrangement of FIG. 1. For example, data device DZ may transmit the second operating mode control signal in the form of a pulse sequence to data end device DT whenever intercommunication device 7 is to be switched in and data end device DT is to be switched out. If, however, data end device DT is to be switched in and the intercommunication device 7 is to be switched out, control tone transmitter STS would transmit the first operating mode control signal in the form of a control tone pulse to control tone receiver STE. All of the other functions of the components in FIG. 1 would remain the same.

Figure 2:
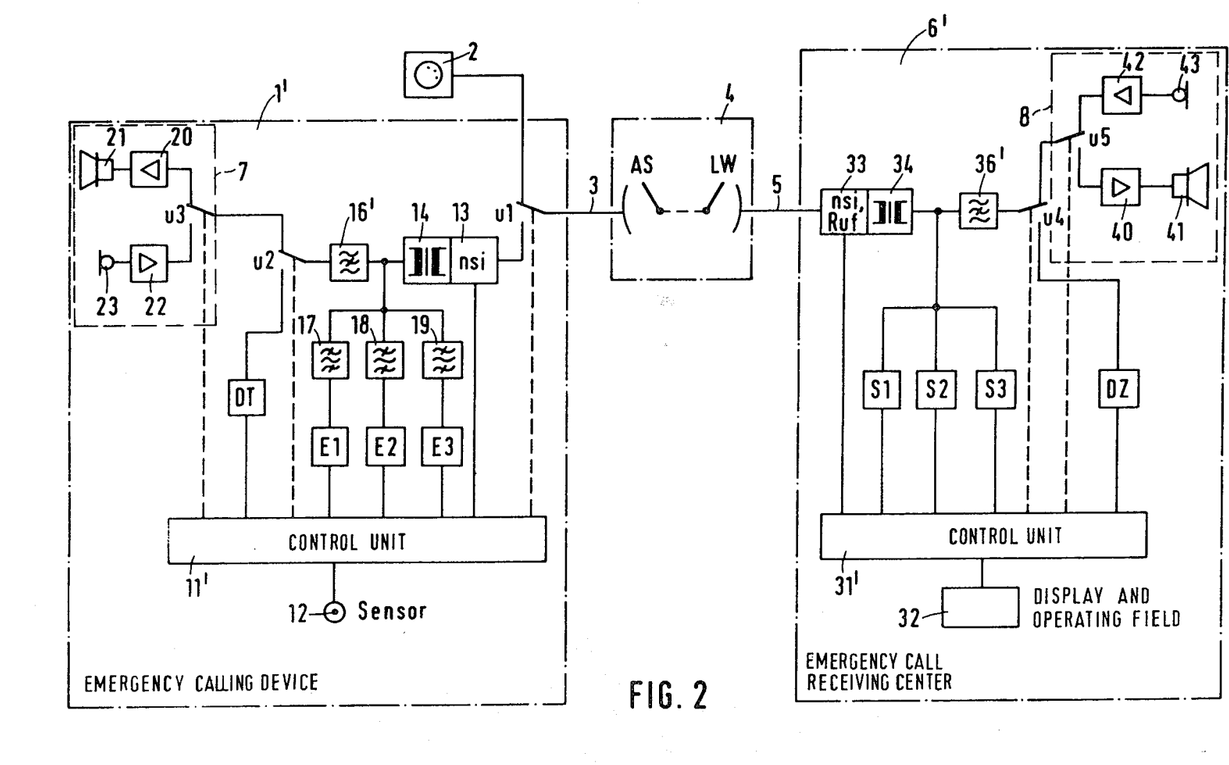
FIG. 2 is a block circuit diagram of another embodiment of the invention.
Figure 3:
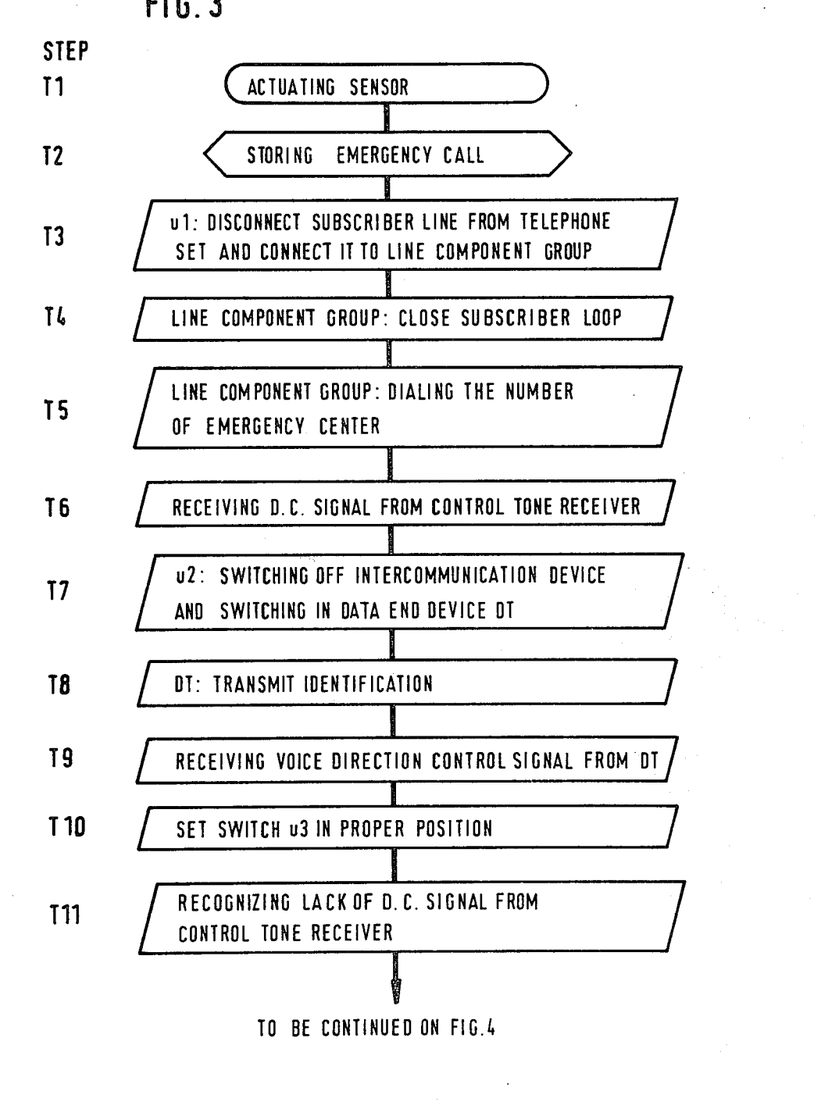
FIGS. 3 to 10 illustrate the steps in the control units shown in FIGS. 1 and 2, whereat FIGS. 3 to 6 concern the emergency calling device and FIGS. 7 to 10 concern the emergency call receiving center.
Figure 4:
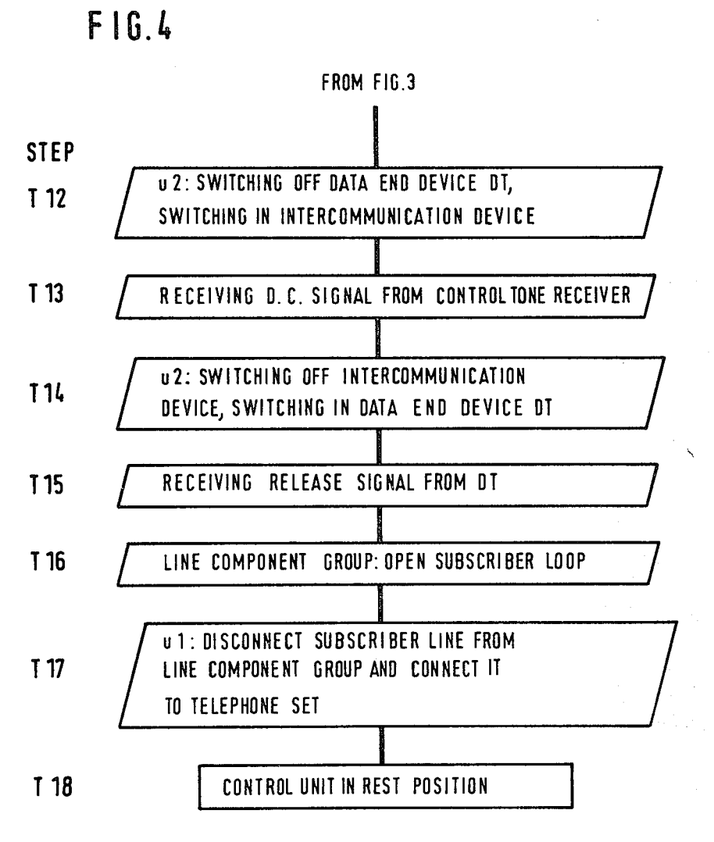

FIG. 2 illustrates an alternative circuit arrangement for implementing the invention. The system of FIG. 2 likewise includes a plurality of emergency calling devices which are connected to a dial telephone exchange system 4 via subscriber lines; however, FIG. 2 shows only one such emergency calling device 1' with its associated subscriber line 3. An emergency center 6' is connected to the dial telephone exchange system 4 via a further subscriber line 5.

Components having the same functions as the corresponding components of FIG. 1 bear the same reference numerals. With respect to their description, reference is made to the corresponding description of FIG. 1.

The differences in FIG. 2 compared to FIG. 1 are that in emergency center 6', there are provided three control tone transmitters S1, S2 and S3 which can be actuated by control unit 31' and which preferably have the following three associated audio frequencies: S1—1633 Hz; S2—697 Hz; S3—941 Hz. Band rejection filter 36' blocks only the audio frequency of 1633 Hz. Emergency calling device 1' correspondingly includes three control tone receivers E1, E2, E3, the d.c. outputs of which are connected with control unit 11', and each control tone receiver has one bandpass filter 17, 18, or 19, respectively, connected ahead of it. Bandpass filter 17 is designed to pass first audio frequency S1 of 1633 Hz, bandpass filter 18 is designed to pass second audio frequency S2 of 697 Hz and bandpass filter 19 is designed to pass third audio frequency S3 of 941 Hz. Band rejection filter 16' rejects only the first audio frequency of 1633 Hz.

Except for the transmission of the operating mode control signals, the functions in the circuit arrangement of FIGS. 1 and 2 coincide. In the circuit arrangement of FIG. 2, the second operating mode control signal, which switches out data end device DT and switches in intercommunication device 7, is formed by a control pulse comprised of the audio frequencies of 1633 Hz and 697 Hz. The first operating mode control signal, to switch out intercommunication device 7 and switch in data end device DT is formed of a control tone pulse comprising the audio frequencies of 1633 Hz and 941 Hz.

Because band rejection filters 16' and 36' filter only the first audio frequency of 1633 Hz out of the useful signals (voice or data, respectively), only control tone receiver E1 is protected against frequencies inadvertently present in the useful signals which simulate control tones. Control tone receivers E2 and E3 may respond to frequencies of 697 Hz or 941 Hz, respectively, in the useful signal. But this is without effect because control unit 11' actuates switch u2 only if control tone receiver E1 and one of the two control tone receivers E2 and E3 have responded. Undesired switching of the operating mode due to frequencies occurring in the useful signals and simulating control tones is thus prevented.

A frequency has been selected as the audio frequency to be filtered out of the useful signal which occurs in a voice signal only at a low amplitude. This is the case for higher frequencies. Filtering out a frequency which occurs only at a low amplitude has the advantage that voice clarity is reduced only slightly.

The protection against undesirable switching of the operating mode by frequencies contained in the useful signal and simulating control tones may be increased by a time and level evaluation. Switching takes place only if the respective control tones are each at least 70 ms long and are received with no more than 4 dB in level difference. The evaluation of the level, or intensity difference between the two audio frequencies, instead of their absolute levels, has the advantage that differences in level due to differences in length of the subscriber lines and other lines need not be considered.

It will be understood that the above description of the present invention is susceptible to various modifications, changes and adaptations, and the same are intended to be comprehended within the meaning and range of equivalents of the appended claims.

What is claimed is:

1. A system for transmitting an emergency call from a person requiring assistance, said system comprising an emergency calling device coupled via at least one subscriber line of a telephone exchange system to an emergency call receiving center having an operator, said emergency calling device including:

automatic dialing means coupled to one such subscriber line and having an actuating sensor, said automatic dialing means automatically dialing a predetermined emergency telephone number upon actuation of said sensor by the person requiring assistance for placing a telephone call via the telephone exchange system to said emergency call receiving center;

first data means selectively connectable to the subscriber line for transmitting predetermined emergency data by frequency keying in the voice band via the telephone exchange system to said emergency call receiving center;

intercommunication means selectively connectable to the subscriber line for establishing a voice connection via the telephone exchange system between the person requiring assistance and the operator in said emergency call receiving center, said intercommunication means including first controllable switching means for switching between states of voice transmission and voice reception; and first control means responsive to a first operating mode control signal transmitted via the telephone exchange system for connecting said first data means to the subscriber line and switching out said intercommunication means, and responsive to a second operating mode control signal transmitted via the telephone exchange system for connecting said intercommunication means to the subscriber line and switching out said first data means; and said emergency call receiving center including:

means coupled to the telephone exchange system for receiving the call from said emergency calling device and establishing a connection via the telephone exchange system between said emergency calling device and said emergency call receiving center;

means for producing a control tone selectively connectable to the telephone exchange system;

second control means for controlling the transmission of said control tone via the telephone exchange system to said emergency calling device, said control tone constituting said first operating mode control signal, and the lack of said control tone constituting said second operating mode control signal; and second data means selectively coupled to the telephone exchange system for selectively transmitting voice direction control signals by frequency keying in the voice band via the telephone exchange system to said emergency calling device for controlling the state of said switching means in said intercommunication means of said emergency calling device.

2. A system for transmitting an emergency call from a person requiring assistance, said system comprising an emergency calling device coupled via at least one subscriber line of a telephone exchange system to an emergency call receiving center having an operator, said emergency calling device including:

automatic dialing means coupled to one such subscriber line and having an actuating sensor, said automatic dialing means automatically dialing a predetermined emergency telephone number upon actuation of said sensor by the person requiring assistance for placing a telephone call via the telephone exchange system to said emergency call receiving center;

first data means selectively connectable to the subscriber line for transmitting predetermined emergency data by frequency keying in the voice band via the telephone exchange system to said emergency call receiving center;

intercommunication means selectively connectable to the subscriber line for establishing a voice connection via the telephone exchange system between the person requiring assistance and the operator in said emergency call receiving center, said intercommunication means including first controllable switching means for switching between states of voice transmission and voice reception; and first control means responsive to a first operating mode control signal transmitted via the telephone exchange system for connecting said first data means to the subscriber line and switching out said intercommunication means, and responsive to a second operating mode control signal transmitted via the telephone exchange system for connecting said intercommunication means to the subscriber line and switching out said first data means; and said emergency call receiving center including:

means coupled to the telephone exchange system for receiving the call from said emergency calling device and establishing a connection via the telephone exchange system between said emergency calling device and said emergency call receiving center;

means for producing a control tone pulse selectively connectable to the telephone exchange system;

second control means for controlling the transmission of said control tone pulse via the telephone exchange system to said emergency calling device, said control tone pulse constituting said first operating mode control signal; and second data means selectively connectable to the telephone exchange system for transmitting a pulse sequence and voice direction control signals by frequency keying in the voice band via the telephone exchange system to said emergency calling device, said pulse sequence constituting said second operating mode control signal and said voice direction control signals being selectively transmitted for controlling the state of said switching means in said intercommunication means of said emergency calling device.

3. A system for transmitting an emergency call from a person requiring assistance, said system comprising an emergency calling device coupled via at least one subscriber line of a telephone exchange system to an emergency call receiving center, having an operator, said emergency calling device including:

automatic dialing means coupled to one such subscriber line and having an actuating sensor, said automatic dialing means automatically dialing a predetermined emergency telephone number upon actuation of said sensor by the person requiring assistance for placing a telephone call via the telephone exchange system to said emergency call receiving center;

first data means selectively connectable to the subscriber line for transmitting predetermined emergency data by frequency keying in the voice band via the telephone exchange system to said emergency call receiving center;

intercommunication means selectively connectable to the subscriber line for establishing a voice connection via the telephone exchange system between the person requiring assistance and the operator in said emergency call receiving center, said intercommunication means including first controllable switching means for switching between states of voice transmission and voice reception; and first control means responsive to a first operating mode control signal transmitted via the telephone exchange system for connecting said first data means to the subscriber line and switching out said intercommunication means, and responsive to a second operating mode control signal transmitted via the telephone exchange system for connecting said intercommunication means to the subscriber line and switching out said first data means; and said emergency call receiving center including:

means coupled to the telephone exchange system for receiving the call from said emergency calling device and establishing a connection via the telephone exchange system between said emergency calling device and said emergency call receiving center;

means selectively connectable to the telephone exchange system for producing first, second and third control tone pulses each having a different audio frequency;

second control means for selectively controlling the transmission to said emergency calling device via said telephone exchange system of a first combination of said first and second control tone pulses, and a second combination of said first and third control tone pulses, said first combination constituting said second operating mode control signal and said second combination constituting said first operating mode control signal; and second data means selectively connectable to the telephone exchange system for selectively transmitting voice direction control signals by frequency keying in the voice band via the telephone exchange system to said emergency calling device for controlling the state of said switching means in said intercommunication means of said emergency calling device.

* * * * *